June 11, 1940.　　　　C. KELLER　　　　2,203,731
MEANS FOR REGULATING AND STARTING THERMAL POWER PLANTS
Filed Jan. 21, 1938　　　　4 Sheets-Sheet 4
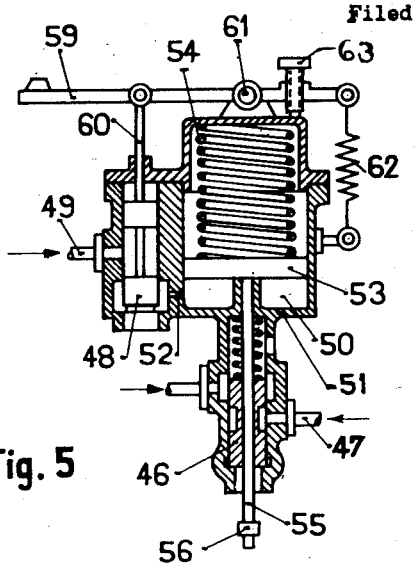
Fig. 5
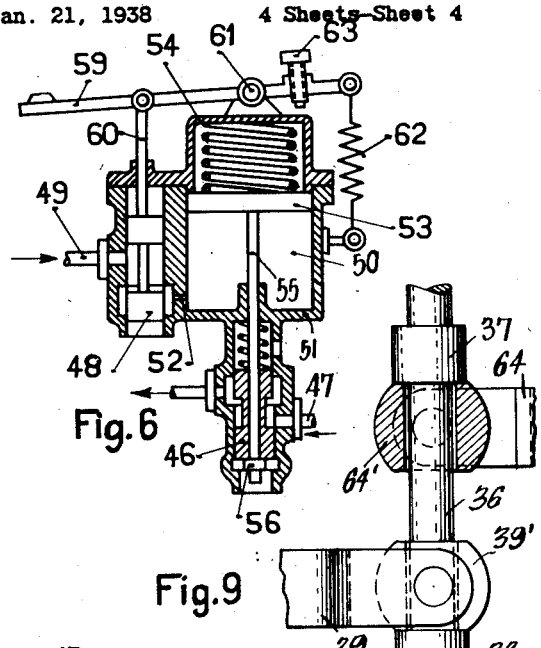
Fig. 6
Fig. 9
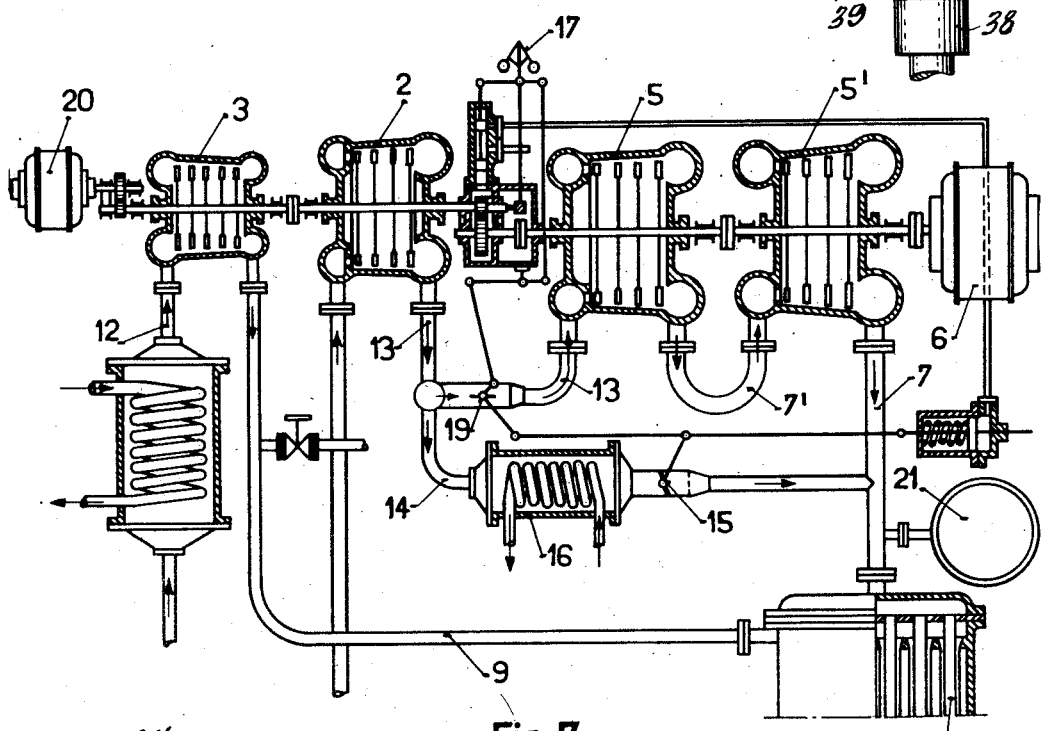
Fig. 7
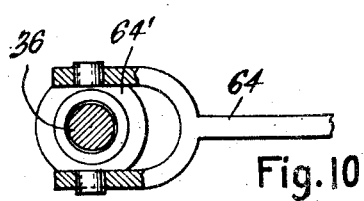
Fig. 10
Inventor
Curt Keller
by Michaelis & Michaelis
Attys.

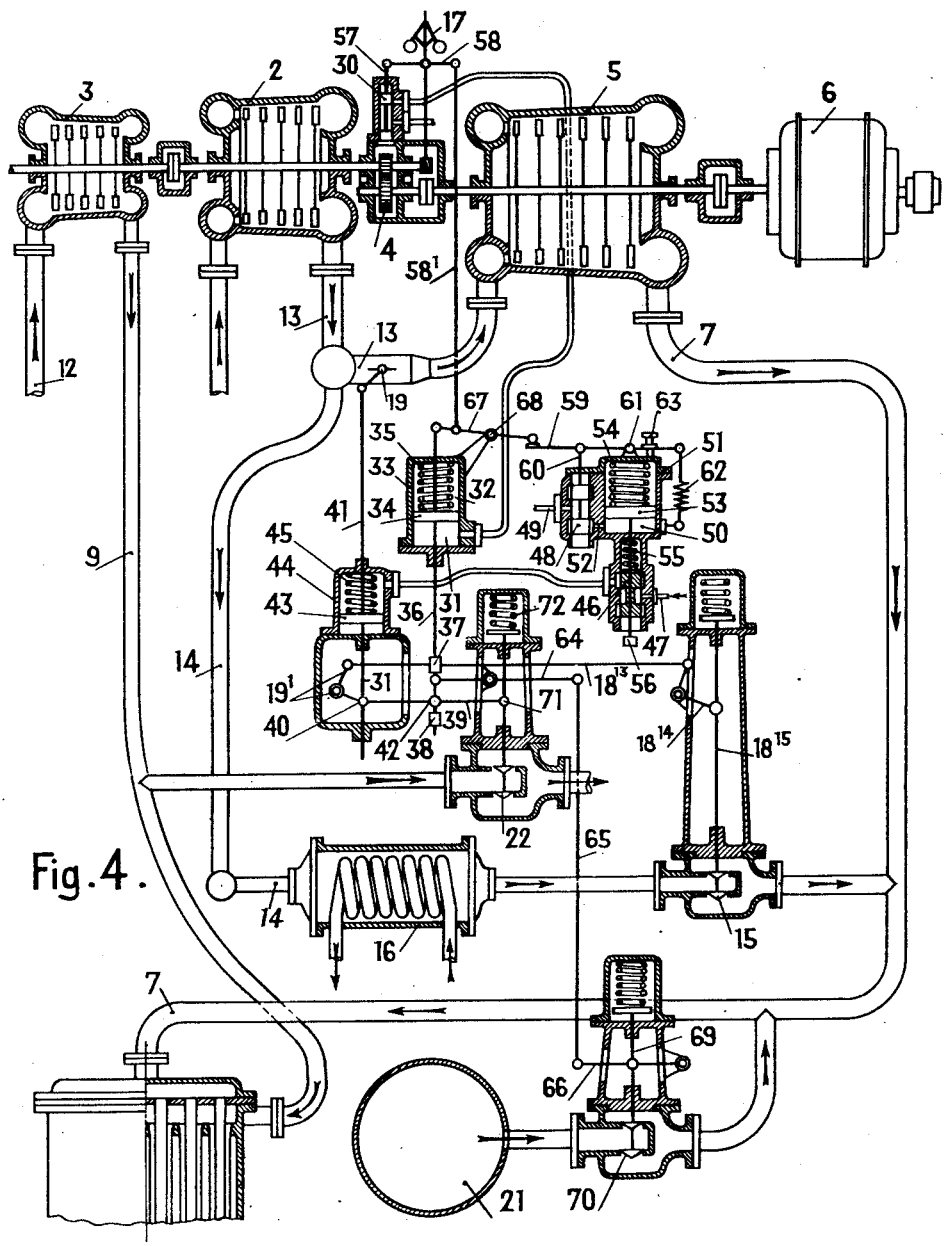

UNITED STATES PATENT OFFICE 2,203,731

MEANS FOR REGULATING AND STARTING THERMAL POWER PLANTS

Curt Keller, Zurich, Switzerland, assignor to Aktiengesellschaft für Technische Studien, Zurich, Switzerland Application January 21, 1938, Serial No. 186,113
In Switzerland January 25, 1937

6 Claims. (Cl. 60—59)

This invention relates to means for rapidly regulating and starting up thermal power plants, in which a gaseous working medium, preferably air, continuously describes a closed cycle under a pressure greater than atmospheric pressure, the working medium which is heated by the external supply of heat thereto, being allowed to expand in at least two turbines, one of which gives up its power, at least in part, externally, while the other drives a compressor, whereafter the working medium is again placed under a higher pressure, an exchange of heat taking place in a heat exchanger between the expanded working medium and that part thereof which has been compressed again but not yet reheated by an external supply of heat.

For the purpose of regulating changes of longer duration in the load on thermal power plants of this kind it has already been proposed to vary the density of the circulating working medium, while keeping the number of revolutions of all machines unchanged, approximately in proportion to the external expenditure of power of one or more turbines for the time being. This may be accomplished, when, for instance, the amount of power required decreases, by withdrawing some of the working medium, which is under a pressure greater than atmospheric, from the otherwise closed circuit by suitable outlet devices, for instance controlled valves. If, however, the amount of power required should drop suddenly, for instance owing to a generator being switched off, it may not be possible to ensure that the density of the working medium in circulation decreases with sufficient rapidity because it takes the working medium to be withdrawn some time to escape from the circuit. Apart therefrom the withdrawal of working medium from the otherwise closed circulation requires fresh working medium to be introduced into the circuit when there is a subsequent increase in the amount of power required, which also takes some time.

It is an object of the present invention to avoid such drawbacks which arise when there are rapid fluctuations in the load on plants of the kind described. For this purpose, according to the present invention, in a plant of this kind a by-pass with a throttling device and an enclosed auxiliary cooler is branched off from a pipe connecting one turbine with the other, in advance of the inlet to the turbine which gives off power. The working medium can flow through this by-pass, avoiding the turbine which gives off power by passing around it into the normal circulation. Preferably the by-pass may open into the pipe which connects this turbine to the heat exchanger in which an exchange of heat takes place between the expanded and the recompressed portion of the circulating working medium. The throttling device provided in the by-pass may be connected with means whereby it can be automatically adjusted in dependence upon the fluctuations of power occurring in the plant, in order to automatically adapt the quantity of working medium passing through the by-pass to the energy to be delivered.

In the drawings affixed to this specification and forming part thereof several embodiments of my invention are illustrated diagrammatically by way of example.

In the drawings:

Figs. 4–6 illustrate the means for rendering the throttling device, which forms one of the main features, inoperative in the case of a low loading of long duration on the plant, Fig. 4 being a diagram of this modified form of the entire plant, while Figs. 5 and 6 illustrate a detail in two different positions.

Fig. 7 shows another modification in which more than one turbine is present beyond the point of the connecting pipe from which the by-pass is branched off.

Figs. 9 and 10 are an elevation, partly in axial section, and a cross section, respectively of a system of checks serving to govern certain valves.

Figure 1:
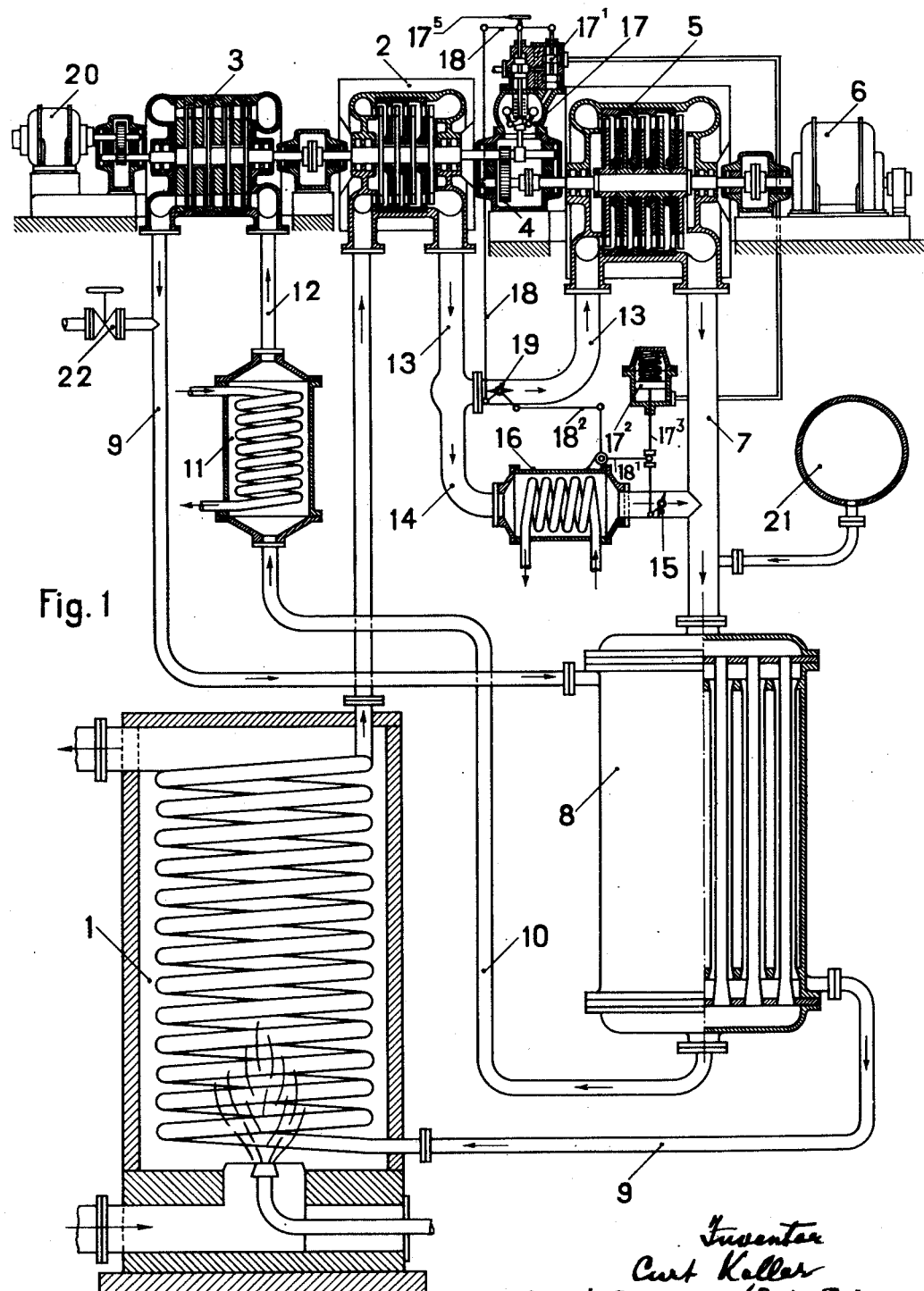
Fig. 1 is a diagram showing a thermal power plant, in which the main features of the invention are combined.

Referring to the drawings and first to Fig. 1, 1 denotes a heater, in which the working medium (preferably air) has heat supplied to it from the outside. The heated air passes first into a high pressure turbine 2, which drives a compressor 3 and is also coupled through gearing 4 to the shaft of a second turbine 5, which gives off its power at least in part externally. In the arrangement here shown this turbine 5 drives a generator 6.

13 denotes a connecting pipe through which the working medium passes from the high pressure turbine 2 to the low pressure turbine 5. The medium coming from the turbine 5 passes through a pipe 7 into a heat exchanger 8, wherein it gives up heat to that part of the working medium which is delivered by the compressor 3 through a pipe 9 into the heater 1. That part of the working medium which leaves the turbine 5 and has been cooled down in the heat exchanger 8, then passes through a pipe 10 into a cooler 11 and from this latter through a pipe 12 into the compressor 3, in which this part of the working medium is recompressed. 14 is the by-pass, which opens into the pipe 7 and is branched off in advance of the inlet to the turbine which gives off power externally, that is to say in advance of the turbine 5. In this by-pass 14 are inserted a shut-off or throttling device 15 and an auxiliary heat exchanging apparatus having the form of a cooler 16. The member 15 is adjusted automatically to the particular position required in each individual case by a speed governor 17 operatively connected to the turbine 5 acting on a pilot valve $17^1$ which controls the flow of a pressure medium to a servo motor $17^2$. The piston rod $17^3$ of this servo motor $17^2$ is operatively connected to the throttling device 15 and by means of a lever $18^1$ and rod $18^2$ also to a shut-off device 19 inserted in the connecting pipe 13 between the point, where the by-pass 14 is branched off, and the inlet to the turbine 5. A restoring mechanism comprising rods 18 is operatively connected to the pilot valve $17^1$ and the shut-off device 19. 20 is an auxiliary motor, for instance an electric motor, which serves to slowly turn the group of machines 3, 2, 5, 6 during the starting stage.

The operation of the plant shown in Fig. 1 is as follows:

As long as normal working conditions prevail and the load remains the same, the device 15 prevents the working medium from flowing through the by-pass 14. As soon, however, as for some reason the load on the turbine 5 suddenly drops, the throttling device 15 is automatically adjusted in such a way that part of the working medium can flow through the by-pass 14 from pipe 13 into pipe 7. At the same time the shut-off device 19 is adjusted into closing position. Part of the working medium coming from the high pressure turbine 2 avoids now the low pressure turbine 5 and flows direct through the by-pass 14 into the heat exchanger 8. In this by-pass 14 the working medium suffers a reduction in pressure by being throttled, and at the same time it is cooled down in the auxiliary cooler 16 to about the temperature to which it would be cooled under normal working conditions by expansion in the low pressure turbine 5. In this way the working medium is prevented, even though avoiding the low pressure turbine 5, from passing at a dangerously high temperature, into the heat exchanger 8, which for economical reasons is made of materials which will not withstand any too high temperature. As a drop of pressure of several atmospheres is available for the flow through the by-pass 14, high speeds result in this passage which may even rise to and beyond sound velocity, so that owing to the high heat transmission values attainable on the side of the working medium the auxiliary cooler 16 can be small. The excess energy available when the turbine 5 is by-passed, is simply destroyed in the by-pass 14 and by the help of the auxiliary cooler 16, instead of being delivered towards the outside by way of the turbine 5 and the generator 6. When the load on the turbine 5 rises again, the shut-off device 19 is automatically opened and the throttling device 15 closed, so that the quantity of working medium flowing through the by-pass 14 is regulated in accordance with the load on the turbine 5.

On the other hand, in the case of a permanently low load on the plant the means for operating the throttling device 15 will be rendered inoperative by hand or automatically and part of the working medium is withdrawn from the circuit by an outlet device 22 which can be shut off.

This is shown by way of example in Figs. 4–6, where 30 is a pilot valve controlling the supply of a pressure medium from a source of pressure (not shown) to two spaces 31, 32 in the stationary casing 33 separated by a piston 34 which a spring 35 normally tends to shift downward and which is linked by means of rod 36, fitted with two checks 37, 38, to a lever 39. This lever is linked at 40 to a rod 41 which is connected at one end to a piston 43 and at the other end to the shut-off device 19. The top-side of the piston 43, which is arranged for displacement in a stationary casing 44, is acted upon by a spring 45 and a liquid, the flow of which from the pipe 47 to the casing 44 is controlled by a piston valve 46. Another piston valve 48 controls the flow of a pressure fluid from a pipe 49 to the space 50 in a stationary casing 51. The liquid under pressure can pass into the space 50 only through a narrow passage 52 (Figs. 5 and 6). In the casing a piston 53 arranged for reciprocation is acted upon by a spring 54 and connected with a rod 55 which is enabled by means of a check 56 to displace the control piston 46. The control piston 30 is operatively connected by means of a rod 57 with a lever 58 (Fig. 4), acted upon by the sleeve of the governor 17. The lever 58 is linked to a rod $58^1$ connected at its lower end with a lever 67. The latter is connected with the rod 36 and is rockably mounted at 68; it serves together with the rods $58^1$, 58, 57 to always return the pilot valve 30 into its neutral position. The right hand end of the lever 67 rests on a lever 59 which is operatively connected by means of a rod 60 with the control piston 48, being linked at 61 to the casing 51 and influenced at its right hand end by the spring 62. A set screw 63 enables the position of lever 59 to be varied manually. A bell crank lever 64, a rod 65 and another bell crank lever 66 connect the rod 36 with a rod 69 which governs a valve 70. This valve controls the communication between the container 21 and the pipe 7. Between the checks 37 and 38, which are fixed on the rod 36, sleeves 64' and 39' loosely mounted on the rod are pivotally connected to the forked ends of the levers 64 and 39, respectively. With the parts in the position shown in Fig. 9, the check 37, on the rod being moved downwardly, presses on the fork of lever 64 which is then moved in anti-clockwise direction without lever 39 being affected by this movement. On the other hand, if the rod 36 rises, check 38 will turn lever 39 without lever 64 being affected thereby.

The operation of the regulating device illustrated in Figs. 4–6 is as follows:

If the load of the turbine 5 drops below its normal value, so that the sleeve of the speed governor 17 rises, the control piston 30 will admit some pressure medium into the space 31 in the casing 33, whereby piston 34 will be lifted and the lever 39 rocked clockwise about the point 71, since spring 72 is more powerful than spring 45. In consequence of these movements rod 41 causes the shut-off device 19 to effect a closing movement, while at the same time causing the throttle 15 to be opened so that now less working medium flows into the turbine 5, whereby its speed drops. For the present the position of valve 22 is not changed. The lifting of the piston 34 causes the lever 67 to swing in a clockwise direction about its fulcrum 68 so that the right hand end of this lever 67 resting on the lever 59 depresses the latter, whereby the valve 48 is caused to admit pressure medium from pipe 49 through the narrow passage 52 into the space 50, the piston 53 and rod 55 will slowly move upwardly. Shortly before piston 53 has reached its upper end position, the check 56 on the rod 55 carries along the valve 46, so that now pressure medium can flow from the pipe 47 into the space above the piston 43 in the casing 44. The pivot point of lever 39 is now shifted from 71 to 42, so that now the shut-off device 19 is acted upon by the rod 41 for opening, valve 15 by lever 19$^1$, rod 18$^{13}$, lever 18$^{14}$ and rod 18$^{15}$ for closing movement, while valve 22 is simultaneously opened. In consequence of this series of movements some working medium is allowed to escape from the closed circuit through valve 22, whereby the density of the circulating working medium and the performance of turbine 5 are reduced, being thus regulated in the sense of a reduction of load through a longer period of time. The dropping of the pressure and the density in the circuit enables the by-pass pipe 14 to be closed and the pipe 13 to be opened correspondingly, so that when the system now works again under reduced load, it will again operate owing to the cutting out of the throttling pipe 14 with a high efficiency. A subsequent rising of the load is only possible by the introduction of fresh working medium from an accumulator 21. If the load then rises, all the movements described above take place in the opposite sense, so that with an increase of the load through a longer period of time the check 37, by means of the bell crank lever 64; rod 65 and lever 66, causes valve 70 to open, allowing pressure medium to escape from the container 21 into pipe 7, whereby the density of the working medium and the performance of the turbine 5 are increased correspondingly.

The auxiliary cooler inserted in the by-pass is preferably fitted with tubes for the passage of the working medium, which are of such length and cross-sectional area of passage that owing to the resistance encountered in these tubes the working medium, by friction and whirling, suffers a pressure drop amounting to at least 25 per cent of the pressure drop otherwise occurring in the turbine which has been by-passed.

Figure 2:
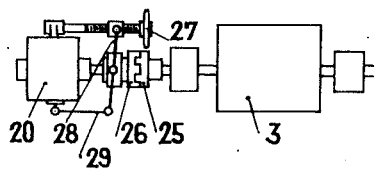
Figs. 2 and 3 are diagrammatic showings of the means for cutting out the auxiliary motor, forming part of this plant, at high speed, in two end positions.
Figure 3:
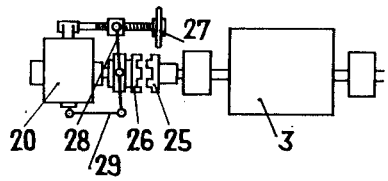

The auxiliary motor 20 is advantageously cut out with rising speed by means of a clutch as shown in Figs. 2 and 3, wherein 20 is the auxiliary motor and 3 the compressor, while 25, 26 are the two parts of a clutch which by means of a hand wheel 27 and a system of levers 28, 29 can be moved into the two end positions shown in Figs. 2 and 3, respectively.

The arrangement of parts above described also enables the intricate problem of starting up the whole plant to be solved in a simple way. When starting up, the shut-off device 19 is closed by acting on a hand screw 17$^5$ operatively connected to the pilot valve 17$^1$ controlling the flow of a fluid under pressure to the servo motor 17$^2$ operatively connected to said shut-off device 19. At the same time the throttling device 15 is opened. Working medium is then circulated through the plant by the motor 20 running at reduced speed and is heated in the heater 1. It now flows only through the high pressure turbine 2 which drives the compressor 3, and then through the by-pass 14 into the heat exchanger 8, from which it returns through the pipes 10 and 12, the compressor 3 and pipe 9 to the heater 1. The turbine 5 is thus by-passed. By gradually introducing fresh working medium, for instance from the reservoir 21 into the circulation the density of the circulating medium is increased. Any possible excess performance of the turbines will be provisionally destroyed in the by-pass 14 by throttling in proportion as the pressure rises. Only when the pressures in the circuit of the turbine 2 and the compressor 3 have risen to the values required and the desired temperatures have been reached, the throttling device 15 will be closed and the device 19 opened, so that then the working medium coming from the high pressure turbine 2 will also flow through the low pressure turbine 5, which gives up its power at least in part externally. The loading of the turbine 5 can now take place very rapidly since the required energy is already available in the circuit. If no by-pass 14 were provided, the loading of the low pressure turbine 5 would have to take place simultaneously with and in dependence upon the starting up of the whole plant. When the group of machines 3, 2, 5, 6 is running at a predetermined speed, the motor 20 is disconnected.

As far as the essential features of the present invention are concerned, the design of the throttling device and the auxiliary cooler inserted in the by-pass 14 is of no avail. The cooling agent may be a liquid or a gas and the heat absorbed by it may be utilized for any desired purpose.

The preferred form, in which the throttling device is arranged, behind the auxiliary cooler in the by-pass, presents the advantage that this device is traversed only by working medium which is already cooled, and that a higher pressure on the working medium prevails in the cooler, which improves the transmission of heat.

The invention can also be used in cases where more than one turbine is provided beyond the point at which the connecting pipe is branched off.

This is shown for instance in Fig. 7, where 5 and 5' are the two turbines arranged in series, while 7' is the pipe connecting same.

The by-pass may open into the circuit at any point between the turbine or turbines which deliver energy externally, and the compressor.

Figure 8:
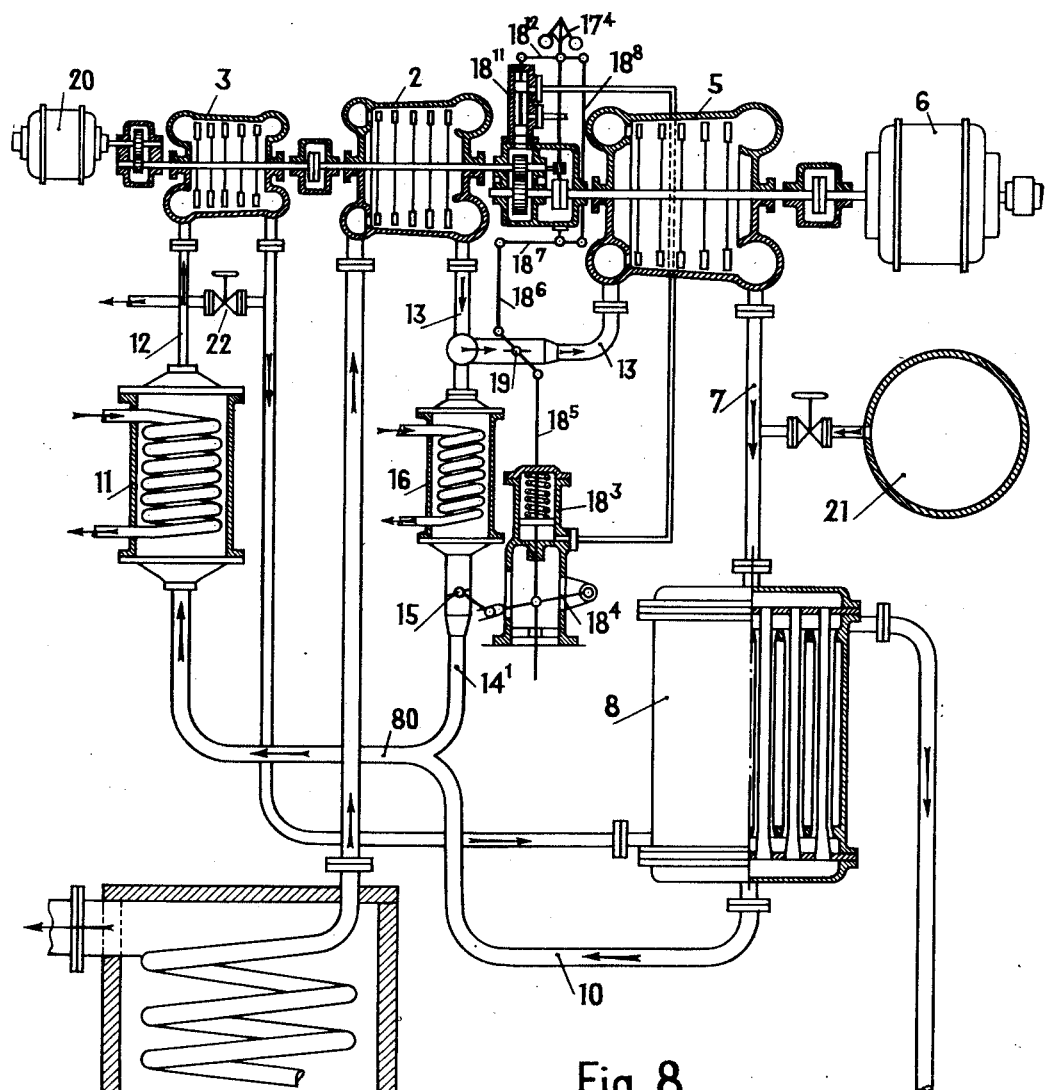
Fig. 8 illustrates an arrangement of the parts in which the by-pass opens into the main circulation between the heat exchanger and the cooler 11.

Thus Fig. 8 illustrates a plant in which the by-pass 14$^1$ opens into the main circuit at 80 between the heat exchanger 8 and the cooler 11. Also in this embodiment of the invention the position of the shut-off devices 15 and 19 is dependent on the actuation of a servo motor 18$^3$ controlled by a pilot valve 18$^{11}$ which is connected to a lever 18$^{12}$ acted upon by a governor 17$^4$. The servo motor 18$^3$ actuates a lever 18$^4$ operatively connected to the shut-off device 15 and a rod 18$^5$ operatively connected to the shut-off device 19, 18$^6$, 18$^7$, 18$^8$ is a mechanism serving to return the pilot valve 18$^{11}$ into its neutral position.

I wish it to be understood that I do not desire to be limited to the exact details of construction shown and described for obvious modification will occur to a person skilled in the art.

I claim:

1. A thermal power plant comprising in combination, a circulation system and a compressor serving to force a working medium through said system, means for heating the working medium, at least two turbines inserted in said system, the first one arranged to drive said compressor, while the second one is arranged for delivering part of its energy externally, a connecting pipe leading from the first to the second turbine, a by-pass branched off said connecting pipe and leading back into the circulation system behind said second turbine, an auxiliary cooler in said by-pass and a shut-off device operatively connected with said by-pass and controlling the passage therethrough of the working medium.

2. A thermal power plant comprising in combination, a circulation system and a compressor serving to force a working medium through said system, means for heating the working medium, at least two turbines inserted in said system, the first one arranged to drive said compressor, while the second one is arranged for delivering part of its energy externally, means in said system for bringing about a heat exchange between the working medium expanded in a turbine and the recompressed, but not yet reheated medium, a connecting pipe leading from the first to the second turbine, a by-pass branched off said connecting pipe, and leading back into the circulation system behind said second turbine, an auxiliary cooler in said by-pass and a shut-off device operatively connected with said by-pass and controlling the passage therethrough of the working medium.

3. The thermal power plant of claim 2, in which a pipe connects the second turbine with the heat exchanging means and in which the by-pass opens into the said pipe.

4. The thermal power plant of claim 1 in combination with means for automatically adjusting the shut-off device in dependence upon variations of the power the plant has to give out.

5. The thermal power plant of claim 1 in combination with means for automatically adjusting the shut-off device in dependence upon variations of the power the plant has to give out and another shut-off device inserted in the connecting pipe between the point, where the by-pass is branched off, and the second turbine, said second shut-off device being arranged to be also adjusted automatically in dependence upon variations of performance of said second turbine.

6. The thermal power plant of claim 1, in which the shut-off device is arranged behind the auxiliary cooler, relative to the direction of flow of the circulating medium.

CURT KELLER.